United States Patent
Lee et al.

(10) Patent No.: US 9,030,917 B2
(45) Date of Patent: May 12, 2015

(54) SYSTEM FOR TRANSFERRING WIRELESS POWER USING ULTRASONIC WAVE

(75) Inventors: Sung Q Lee, Daejeon (KR); Gunn Hwang, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 782 days.

(21) Appl. No.: 13/310,550

(22) Filed: Dec. 2, 2011

(65) Prior Publication Data

US 2012/0155220 A1 Jun. 21, 2012

(30) Foreign Application Priority Data

Dec. 17, 2010 (KR) .......................... 10-2010-0129920

(51) Int. Cl.
G01S 11/00 (2006.01)
G01S 11/14 (2006.01)

(52) U.S. Cl.
CPC ...................................... *G01S 11/14* (2013.01)

(58) Field of Classification Search
CPC ....................................................... G01S 11/14
See application file for complete search history.

(56) References Cited

U.S. PATENT DOCUMENTS 4,180,791 A * 12/1979 Tiemann ........................ 367/105
6,798,716 B1 9/2004 Charych
2007/0109121 A1 5/2007 Cohen
2008/0265835 A1 10/2008 Reed et al.
2008/0309452 A1 12/2008 Zeine
2009/0028002 A1* 1/2009 Sugiura et al. .................. 367/99
2010/0164433 A1 7/2010 Janefalkar et al.
2010/0201203 A1* 8/2010 Schatz et al. .................. 307/104

FOREIGN PATENT DOCUMENTS

JP          2009-072652        4/2009
KR   10-2008-0100561 A       11/2008
KR   10-2009-0027312 A        3/2009
KR   10-2009-0098239 A        9/2009

OTHER PUBLICATIONS

Ozeri Ultrasonic 50, 2010, pp. 556-566.*
Ozeri, Ultrasonic 50, 2010, pp. 666-674.*

* cited by examiner

*Primary Examiner* — Luke Ratcliffe
*Assistant Examiner* — Hovhannes Baghdasaryan

(57) ABSTRACT

Disclosed is a system of transferring wireless power using an ultrasonic wave, including: an ultrasonic wave generating device converting and transferring electric energy to an ultrasonic wave; and an ultrasonic wave receiving device receiving the ultrasonic wave to convert the ultrasonic wave to electric energy, wherein the ultrasonic wave generating device includes a radiation plate with a plurality of ultrasonic elements and controls an effective area of the radiation plate by turning on/off the plurality of ultrasonic elements so that the ultrasonic wave receiving device is disposed at a position minimizing dispersion effect due to a circular radiation of the ultrasonic wave.

9 Claims, 7 Drawing Sheets

RAYLEIGH DISTANCE
($D = \pi a^2 f/c$)

SYSTEM FOR TRANSFERRING WIRELESS POWER USING ULTRASONIC WAVE

CROSS-REFERENCE TO RELATED APPLICATIONS

This application is based on and claims priority from Korean Patent Application No. 10-2010-0129920, filed on Dec. 17, 2010, with the Korean Intellectual Property Office, the present disclosure of which is incorporated herein in its entirety by reference.

TECHNICAL FIELD

The present disclosure relates to a system for transferring wireless power, and more particularly, to a system for transferring wireless power using an ultrasonic wave by which energy is wirelessly transferred by using an ultrasonic wave having little harmfulness to a human body and high energy transfer efficiency and when a ultrasonic wave generating device and a ultrasonic wave receiving device are disposed with a certain distance, the ultrasonic wave generating device changes an effective area of a radiation plate in itself, considering the distance between two devices to control a Rayleigh distance, thereby maximizing the energy transfer efficiency.

BACKGROUND

There are generally three methods of transferring energy wirelessly. The first method transfers power using electromagnetic induction, the second method transfers the power using wireless radio frequency, and the third method transfers the power using ultrasonic wave.

The first method of transferring the power using the electromagnetic induction is disclosed in US Patent Application Laid-Open No. 2008/0265835 (Wireless Power Transfer System, Daniel P Reed) and Korean Patent Application No. 2007-0092435 (System for Wireless Charging, LG Electronics Co., Ltd, Kim Sung Il). The method includes a charging body generating charging power by using an external power supply and a power receiving module receiving the charging power from the charging body through an electromagnetic induction. The electromagnetic induction method was almost commercialized because of the high efficiency.

However, an electromagnetic wave is limited to be used within a close distance ranging from several centimeters from the charging body because transfer energy is rapidly reduced to be in inverse proportion to squared distance according to a distance in air. In order to increase an operational distance, a size of an element is increased and for example, in order to transmit the electromagnetic wave in high efficiency at a transmitted distance of 1 m, the element has the size of about 1 m. In addition, since the charging power generating device needs large power, a problem on the harmfulness to the human body is present around the power generating device.

The second method of transferring the power using the wireless frequency is disclosed in US Patent Application Laid-Open No. 2007-0109121 (Harvesting Ambient Radio Frequency Electromagnetic Energy for Powering wireless Electronic Device, Sensors and Sensor Networks and Applications Thereof, Marc H. Cohen). In this disclosure, energy of an RF having a very long wave distance is collected, so as to be used in an electronic device, a sensor, and a sensor network. The RF exists much even in air and the wave distance thereof is very wide, but the energy density is very low and the energy amount is very small even after energy conversion, such that actual efficiency is deteriorated.

The third method of transferring the power using the ultrasonic wave is disclosed in U.S. Pat. No. 6,798,716 (System and Method for Wireless Electrical power Transmission, Arthur Charych, BC System Inc.). The disclosure discloses a method of collecting a beam in the center by arranging ultrasonic wave generating devices and controlling phases thereof and a method of controlling a beam direction through a phase control.

In addition, US Patent Application Laid-Open No. 2010/0164433 (Wireless Battery Charging Systems, Battery Systems and Charging Apparatus, Anand Janefalkar, Motorola Inc.) discloses a method of charging a portable terminal mounting a system of charging a battery using an ultrasonic wave generating device.

However, in the related art, the method of transferring the power using the ultrasonic wave collects the ultrasonic wave by controlling the phase and the direction of the ultrasonic wave, while does rarely not disclose that the effective area of the radiation plate in the ultrasonic wave generating device is controlled to maximize the energy transfer efficiency, like the present disclosure.

SUMMARY

The present disclosure has been made in an effort to provide a system for transferring wireless power using ultrasonic wave that an effective area of a radiation plate in an ultrasonic wave generating device is controlled so that an ultrasonic wave receiving device is disposed at a position having the smallest dispersion effect due to a circular radiation in a medium, thereby maximizing the energy transfer efficiency.

An exemplary embodiment of present disclosure provides a system of transferring wireless power using an ultrasonic wave, including: an ultrasonic wave generating device converting and transferring electric energy to an ultrasonic wave; and an ultrasonic wave receiving device receiving the ultrasonic wave to convert the ultrasonic wave to electric energy, wherein the ultrasonic wave generating device includes a radiation plate with a plurality of ultrasonic elements and controls an effective area of the radiation plate by turning on/off the plurality of ultrasonic elements so that the ultrasonic wave receiving device is disposed at a position having smallest dispersion effect due to a circular radiation of the ultrasonic wave.

According to the exemplary embodiments of the present disclosure, a system of transferring wireless power using an ultrasonic wave is provided by controlling an effective area of a radiation plate in an ultrasonic wave generating device so that an ultrasonic wave receiving device is disposed at a position having smallest dispersion effect due to a circular radiation in a medium, such that the ultrasonic wave receiving device is disposed in a near field to concentrate ultrasonic energy in the ultrasonic wave receiving device, thereby increasing efficiency in the ultrasonic energy and maximizing the efficiency in the ultrasonic energy.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof The illustrative embodiments described in the detailed description, drawing, and claims are not meant to be limiting. Other embodiments may be utilized, and other changes may be made, without departing from the spirit or scope of the subject matter presented here.

Figure 1:
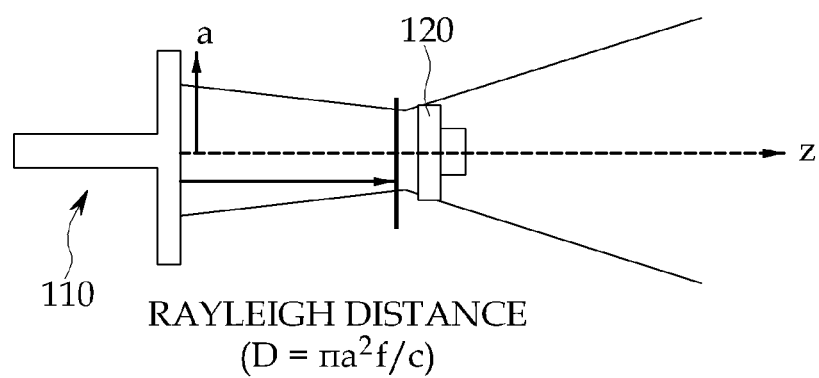
FIG. 1 is a diagram showing a Rayleigh distance and a radiation phenomenon according to a frequency and an effective area of an ultrasonic wave in a system of transferring wireless power using ultrasonic wave according to an exemplary embodiment of the present disclosure.
Figure 2:
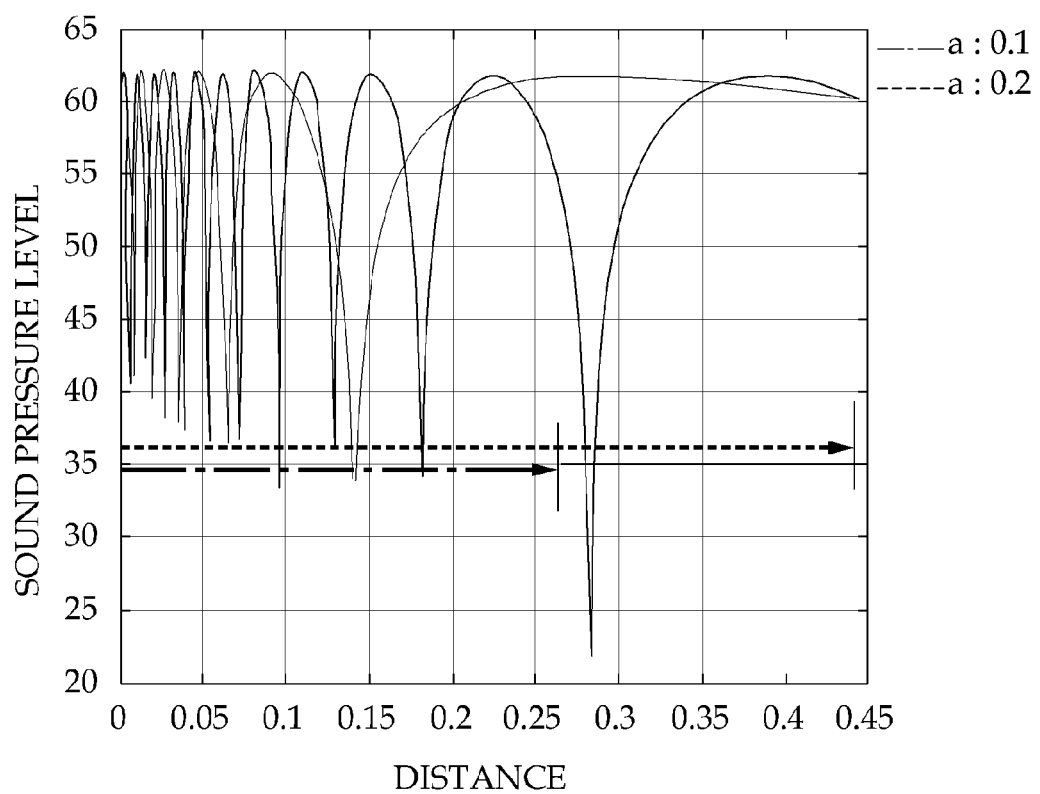
FIG. 2 is a graph illustrating an SPL (Sound Pressure Level) value in a radiation center axis in order to show a sound pressure reduction due to a circular radiation after a Rayleigh distance.

FIG. 1 is a diagram showing a Rayleigh distance and a radiation phenomenon according to a frequency and an effective area of an ultrasonic wave in a system of transferring wireless power using an ultrasonic wave according to an exemplary embodiment of the present disclosure and FIG. 2 is a graph illustrating an SPL (Sound Pressure Level) value in a radiation center axis in order to show a sound pressure reduction due to a circular radiation after a Rayleigh distance.

Referring to FIG. 1, a radiation shape of an ultrasonic wave generated in an ultrasonic wave generating device 110 is determined by a used frequency, an area of a radiation plate, and a sound velocity in a medium as the following Equation 1.

$$P_{gaussian}(z) = P_0 e^{-z/l_a} \frac{1}{1 - j2cz/\omega a^2} \qquad \text{[Equation 1]}$$

Herein, a is a diameter of a radiation plate, c is a sound pressure, "$P_0$ is a reference point", z is a distance from a reference point, 1a is an attenuation distance of a sound pressure, and $\omega$ and f are operational frequencies.

A section defined as a Rayleigh distance is referred to as a near-field section and the sound pressure repetitively shows a destructive and constructive phenomenon in this section as shown in FIG. 2, and a radiation shape of the ultrasonic wave has a focused-beam shape like being gradually in focus. However, when getting out of the Rayleigh distance, as shown in FIG. 1, the sound wave is changed in a circular radiation and has a dispersed beam shape.

Accordingly, when ultrasonic wave receiving device 120 is disposed at the most focused distance of the beam before the beam is dispersed, ultrasonic wave receiving device 120 receives largest ultrasonic energy. In the exemplary embodiment, in order to use a radiation characteristic of the beam, ultrasonic wave generating device 110 changes the effective area of the radiation plate, such that the Rayleigh distance is controlled, thereby providing the method of maximizing energy transfer efficiency. Herein, a Rayleigh distance D is defined by the following Equation 2.

$$D = ka^2/2 \qquad \text{[Equation 2]}$$

Herein, $k = 2\pi f/c$, f is a frequency, c is a sound velocity, and a is a diameter of a radiation plate.

Figure 3:
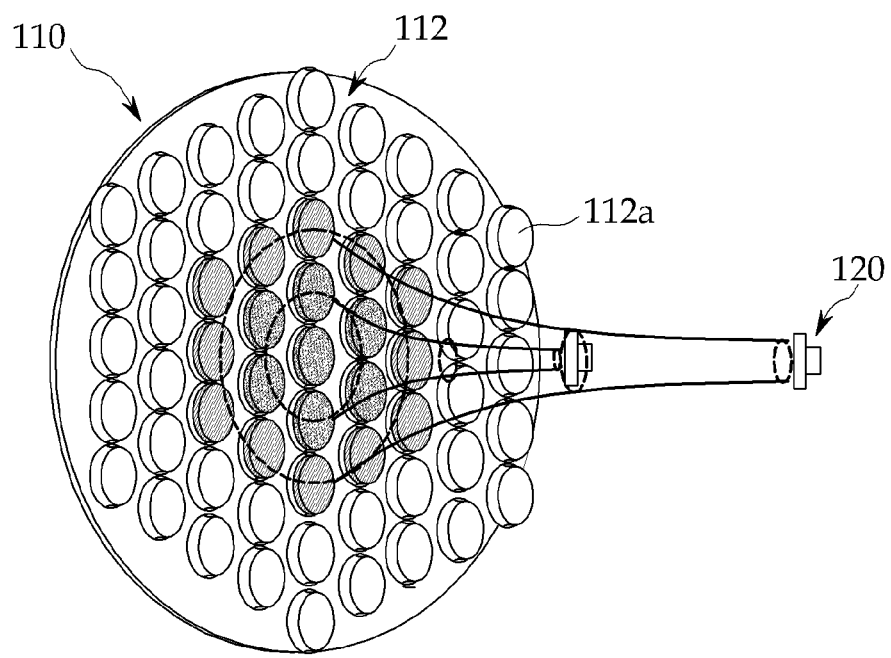
FIG. 3 is a diagram showing variation in a Rayleigh distance and a focused-beam radiation shape according to an effective area of a radiation plate in a system of transferring wireless power using an ultrasonic wave according to an exemplary embodiment of the present disclosure.

FIG. 3 is a diagram showing variation in a Rayleigh distance and a focused-beam radiation shape according to an effective area of a radiation plate in a system of transferring wireless power using an ultrasonic wave according to an exemplary embodiment of the present disclosure.

Referring to FIG. 3, a system of transferring wireless power using an ultrasonic wave according to an exemplary embodiment of the present disclosure includes an ultrasonic wave generating device 110, an ultrasonic wave receiving device 120, and the like.

Ultrasonic wave generating device 110 converts electric energy into an ultrasonic wave to transfer the ultrasonic wave to ultrasonic wave receiving device 120.

Ultrasonic wave generating device 110 according to the exemplary embodiment includes a radiation plate 112 with a plurality of ultrasonic elements 112a. Ultrasonic wave generating device 110 turns on/off the plurality of ultrasonic elements 112a according to a distance between ultrasonic wave generating device 110 and ultrasonic wave receiving device 120 so that ultrasonic wave receiving device 120 is disposed at a position having the smallest dispersing effect due to a circular radiation of the ultrasonic wave to control an effective area of radiation plate 112. Herein, ultrasonic wave generating device 110 may measure the distance between ultrasonic wave generating device 110 and ultrasonic wave receiving device 120 by using a time difference or a phase difference using the ultrasonic wave, or by using a separate distance sensor. In addition, the plurality of ultrasonic elements 112a may be disposed in a circular or polygonal shape having a symmetric structure.

As shown in FIG. 3, the effective area of radiation plate 112 may vary depending on the distance between ultrasonic wave generating device 110 and ultrasonic wave receiving device 120.

Figure 4:
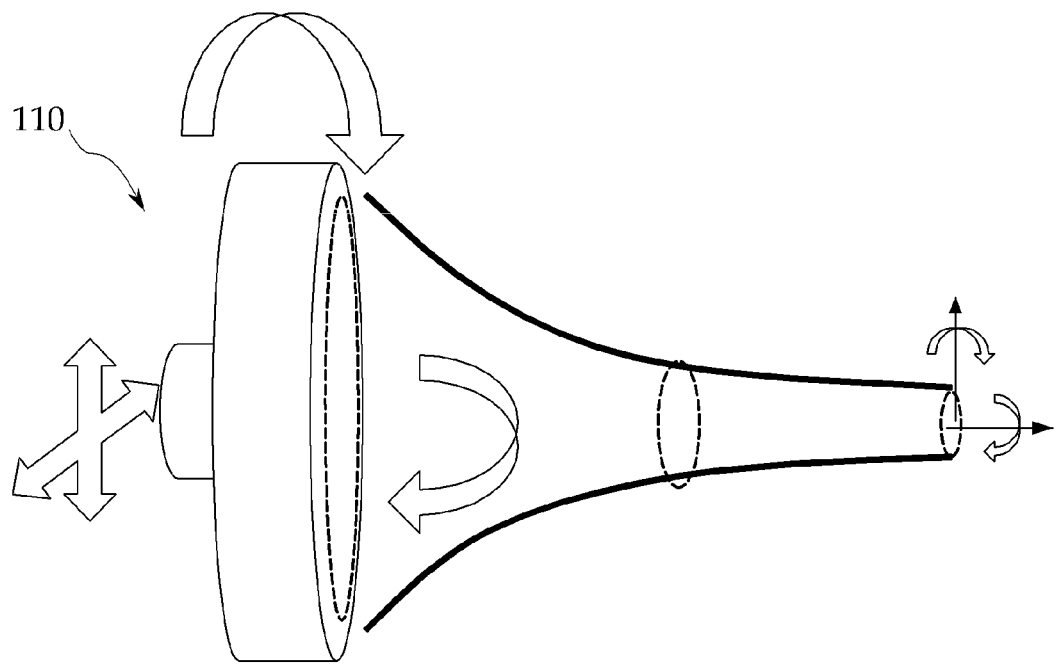
FIG. 4 is a diagram showing a direction control of X, Y and pan/tilt for arranging ultrasonic wave generating devices according to an exemplary embodiment of the present disclosure.

FIG. 4 is a diagram showing a direction control of X, Y and pan/tilt for arranging ultrasonic wave generating devices according to an exemplary embodiment of the present disclosure.

Referring to FIG. 4, when an electronic device such as a TV, a portable terminal, a robot, and the like including ultrasonic wave receiving device 120 needs to be arranged because the electronic device is in discord with a direction of ultrasonic wave generating device 110, ultrasonic wave generating device 110 may be controlled in X, Y and pan/tilt directions by using a hand and a motor. For example, when the TV including ultrasonic wave receiving device 120 is used to be put up on the wall, ultrasonic wave generating device 110 is arranged in the X, Y and pan/tilt directions according to a position of the TV including ultrasonic wave receiving device 120.

When ultrasonic wave generating device 110 is in concord with ultrasonic wave receiving device 120, ultrasonic wave generating device 110 may be linked with a display device displaying an arrangement degree through an LED, a sound, or the like.

Figure 5:
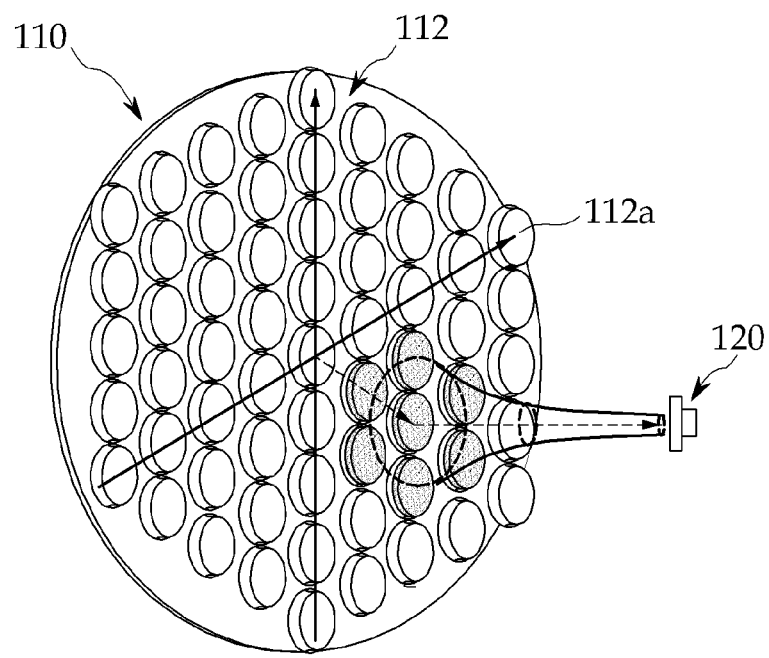
FIG. 5 is a diagram showing controls of a position due to an operation of each ultrasonic element and a radiation beam shape in an ultrasonic wave generating device according to an exemplary embodiment of the present disclosure.

FIG. 5 is a diagram showing controls of a position due to an operation of each ultrasonic element and a radiation beam shape in an ultrasonic wave generating device according to an exemplary embodiment of the present disclosure.

Referring to FIG. 5, when an electronic device including a ultrasonic wave receiving device 120 is disposed with an ultrasonic wave generating device 110 with an offset, ultrasonic wave generating device 110 selects a center point based on ultrasonic wave receiving device 120, calculates a distance from the selected center point to ultrasonic wave receiving device 120, and operates some of separate ultrasonic elements 112a of ultrasonic wave generating device 110 so as to maximize an effective area of the radiation plate 112.

Accordingly, although the electronic device such as a robot, a terminal, or the like including ultrasonic wave receiving device 120 is close to ultrasonic wave generating device 110, when the electronic device is not completely arranged at a center, energy transfer between ultrasonic wave generating device 110 and ultrasonic wave receiving device 120 may be maximized by applying the method.

Figure 6:
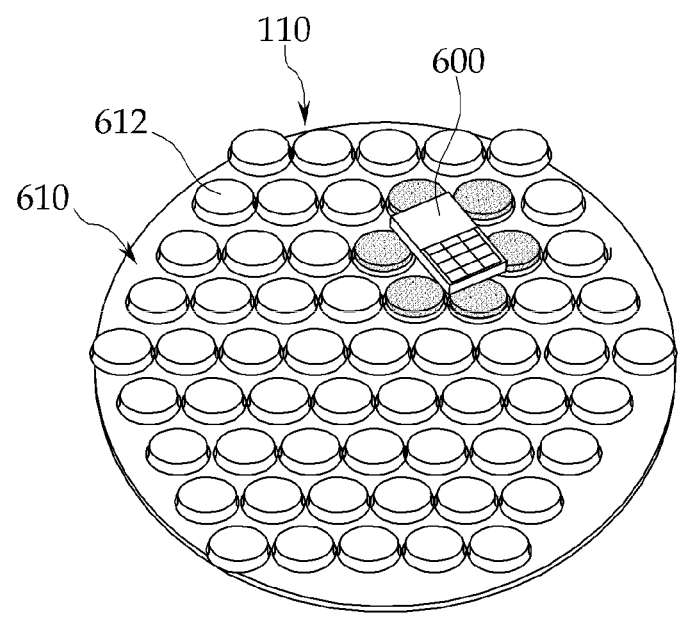
FIG. 6 is a diagram showing an example of transferring wireless energy in an ultrasonic wave generating device having a pad shape according to an exemplary embodiment of the present disclosure.

FIG. 6 is a diagram showing an example of transferring wireless energy in an ultrasonic wave generating device having a pad shape according to an exemplary embodiment of the present disclosure.

As shown in FIG. 6, an ultrasonic wave generating device 110 according to the exemplary embodiment may be in a pad shape and an electronic device 600 including an ultrasonic wave receiving device 120 may be charged by being contacted or disposed at predetermined intervals on pad 610.

Accordingly, although a user puts a terminal or electronic device 600 at any position or any distance on pad 610, energy transfer efficiency may be maximized by an operation of separate ultrasonic elements 612.

Figure 7:
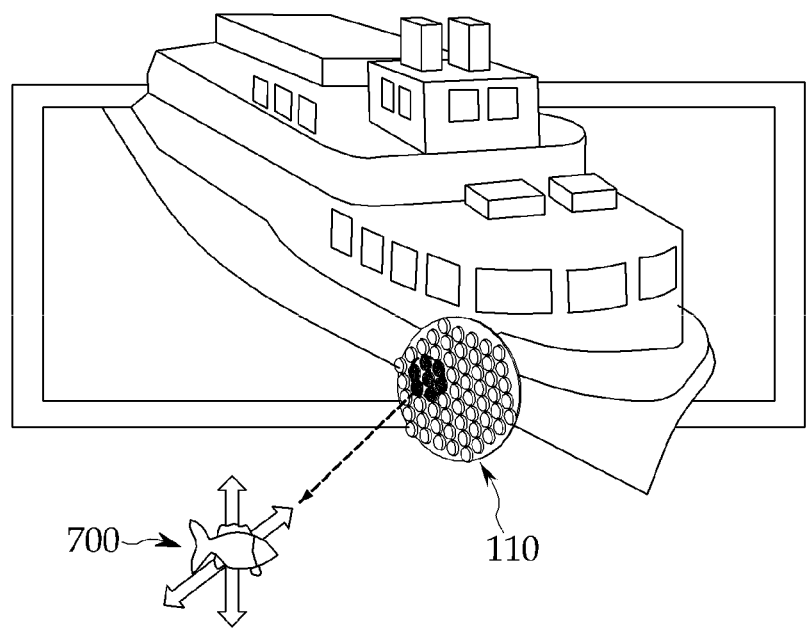
FIG. 7 is a diagram showing an example of transferring wireless energy to a mobile electronic device from an ultrasonic wave generating device according to an exemplary embodiment of the present disclosure.

FIG. 7 is a diagram showing an example of transferring wireless energy to a mobile electronic device from an ultrasonic wave generating device according to an exemplary embodiment of the present disclosure.

Referring to FIG. 7, a transfer medium of an ultrasonic wave may be air and water.

An ultrasonic wave generating device 110 according to the exemplary embodiment may supply energy to a mobile electronic device 700 such as a fish robot and the like including an ultrasonic wave receiving device 120 in the water. Mobile electronic device 700 moves around the ultrasonic wave generating device 110 having maximum energy transfer efficiency to receive efficiently the energy from ultrasonic wave generating device 110. To this end, mobile electronic device 700 recognizes the position of ultrasonic wave generating device 110 by using the ultrasonic wave.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A system of transferring wireless power using an ultrasonic wave, the system comprising:
   an ultrasonic wave generating device configured to convert electric energy into an ultrasonic wave and transfer the ultrasonic wave; and
   an ultrasonic wave receiving device configured to receive the ultrasonic wave and convert the ultrasonic wave into electric energy,
   wherein the ultrasonic wave generating device comprises a radiation plate, which includes a plurality of ultrasonic elements, and adjusts an effective area of the radiation plate by selectively turning on/off the plurality of ultrasonic elements so that a beam of the ultrasonic wave is substantially focused at a position where the ultrasonic wave receiving device is allocated, and
   wherein the ultrasonic wave generating device selects a center point of the effective area that corresponds to the position of the ultrasonic wave receiving device, and turns on some of the ultrasonic elements around the selected center point while keeping the rest of the ultrasonic elements turned off.

2. The system of claim 1, wherein the ultrasonic wave generating device controls the effective area of the radiation plate according to a distance between the ultrasonic wave generating device and the ultrasonic wave receiving device.

3. The system of claim 2, wherein the ultrasonic wave generating device measures the distance based on at least one of a time difference and a phase difference, which are obtained using the ultrasonic wave.

4. The system of claim 2, wherein the ultrasonic wave generating device measures the distance using a distance sensor.

5. The system of claim 1, wherein the plurality of ultrasonic elements are disposed in a circular or polygonal shape having a symmetric structure.

6. The system of claim 1, wherein the ultrasonic wave generating device is controlled in a X, Y, or pan/tilt direction on a radiated vertical surface with respect to the ultrasonic wave receiving device.

7. The system of claim 1, wherein the ultrasonic wave generating device calculates a distance from the selected center point to the ultrasonic wave receiving device, and determines ultrasonic elements that are turned on so as to maximize an effective area of the radiation plate, when the ultrasonic wave receiving device is disposed with the ultrasonic wave generating device with an offset.

8. The system of claim 1, wherein the ultrasonic wave generating device is configured in a pad shape, and the ultrasonic wave receiving device contacts a pad or is disposed with a predetermined distance from the pad so as to receive the ultrasonic wave from the pad.

9. The system of claim 1, wherein the ultrasonic wave receiving device recognizes a position of the ultrasonic wave generating device using the ultrasonic wave and continuously moves to a position maximizing energy transfer effeciency of the ultrasonic wave around the ultrasonic wave generating device.

* * * * *